(12) United States Patent
Khouzam et al.

(10) Patent No.: US 7,468,733 B2
(45) Date of Patent: Dec. 23, 2008

(54) METHOD AND SYSTEM FOR IMPROVING COLOR REDUCTION

(75) Inventors: Gilles A. Khouzam, Bothell, WA (US);
Gilman K. Wong, Redmond, WA (US);
Cyra S. Richardson, Redmond, WA (US); Donald B. Curtis, Highland, UT (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/960,352

(22) Filed: Oct. 6, 2004

(65) Prior Publication Data

US 2006/0071939 A1  Apr. 6, 2006

(51) Int. Cl.
G09G 5/36 (2006.01)
G09G 5/02 (2006.01)
G09G 5/00 (2006.01)
G06K 9/00 (2006.01)
G06K 9/32 (2006.01)
G06F 3/08 (2006.01)

(52) U.S. Cl. .................. 345/589; 345/600; 345/606; 345/643; 345/549; 382/162; 382/165; 382/167; 382/300; 358/518

(58) Field of Classification Search ......... 345/589–590, 345/596, 597, 600–601, 606, 639, 643, 540, 345/549, 586, 613, 536; 382/162, 165, 168, 382/170, 194, 300, 218–221, 166–167, 171, 382/173, 254, 274, 282, 305; 348/519–520, 348/538–539, 557, 560, 630; 358/522–525, 358/518–519, 515
See application file for complete search history.

(56) References Cited

U.S. PATENT DOCUMENTS 5,689,575 A * 11/1997 Sako et al. .................. 382/118

\* cited by examiner

*Primary Examiner*—Wesner Sajous
(74) *Attorney, Agent, or Firm*—Workman Nydegger (57) ABSTRACT

A method and system for reducing or eliminating artifacts that may occur during color reduction of images. A bias is added to a data structure that is arranged to store counts of pixel colors of an image. Counts of pixel colors of the image are added to the data structure. Via the data structure, colors from the image are grouped into buckets until the number of buckets is less than or equal to a number of colors in a palette. Then, colors of pixels in the image are mapped to colors in the palette.

19 Claims, 5 Drawing Sheets

METHOD AND SYSTEM FOR IMPROVING COLOR REDUCTION

FIELD OF THE INVENTION

The invention relates generally to computers, and more particularly images.

BACKGROUND

Images may be displayed on many different types of devices. Some devices such as cell phones may have a relatively small palette of colors available with which to display an image. Other devices such as computer displays may have a relatively large palette of colors available with which to display an image. With current techniques, determining which colors to display and how pixels in the image should map to those colors may introduce artifacts when displaying certain images on various displays. What is needed is a method and system for reducing or eliminating such artifacts.

SUMMARY

Briefly, the present invention provides a method and system for reducing or eliminating artifacts that may occur during color reduction of images. A bias is added to a data structure that is arranged to store counts of pixel colors of an image. Counts of pixel colors of the image are added to the data structure. Via the data structure, colors from the image are grouped into buckets until the number of buckets is less than or equal to a number of colors in a palette. Then, colors of pixels in the image are mapped to colors in the palette.

In one aspect of the invention, adding the bias comprises adding to each count of the data structure. In another aspect of the invention, adding the bias comprises adding to each count of the data structure that corresponds to a color in a half-tone palette. In yet another aspect of the invention, adding a bias to the data structure comprises adding to counts of the data structure as indicated by a template.

In one aspect of the invention, the bias is added before adding counts of pixel colors of the image to the data structure. In another aspect of the invention, the bias is added after adding counts of pixel colors of the image to the data structure.

Appropriately biasing the data structure may reduce or eliminate artifacts.

Other advantages will become apparent from the following detailed description when taken in conjunction with the drawings, in which:

DETAILED DESCRIPTION

Exemplary Operating Environment

Figure 1:
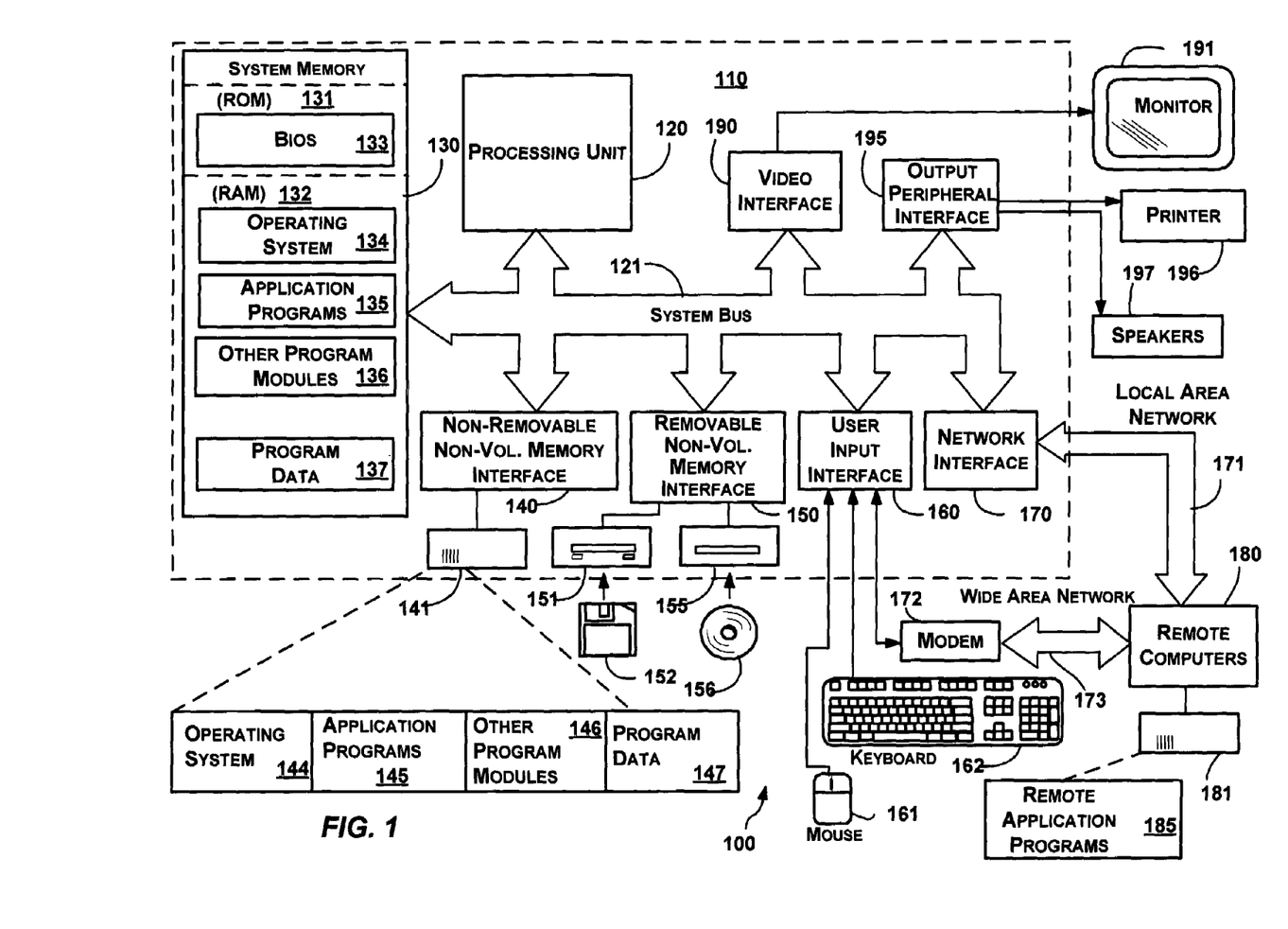
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Color Reduction

Color reduction involves taking an image and reducing the number of colors while maintaining an optimal representation. Color reduction usually involves analyzing the color distribution of the image to generate a collection of the most used colors and then remapping all the colors in the image to this new reduced set of colors.

Sometimes a color in the image is not displayable on a device. For example, the device may not be able to display a particular shade of blue that is found in an image. Sometimes although a device is capable of displaying a color found in the image, the device has limitations with respect to how many colors it may display simultaneously. For example, a device may be able to display almost any set of 256 colors but may not be able to display more than 256 colors simultaneously.

A set of colors with which an image may be displayed on a device is sometimes referred to as a palette. This palette may be pre-selected or defaulted to a specific set of colors based on the predicted types of images the device may display or may be selected in conjunction with displaying a specific image or set of images.

Figure 2:
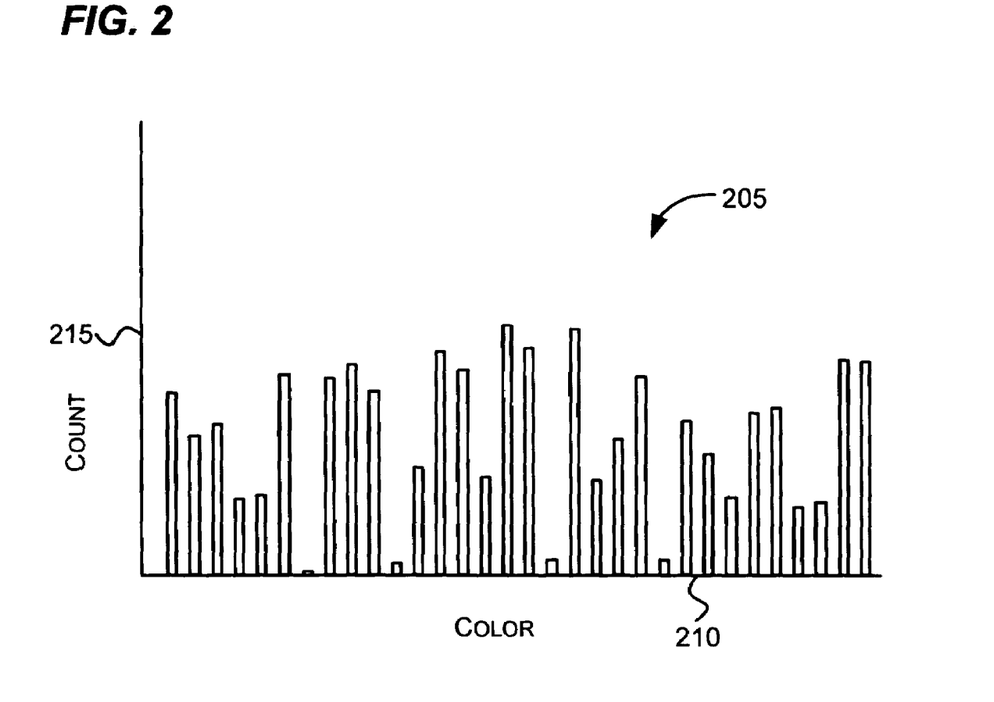
FIG. 2 is a histogram in accordance with various aspects of the invention.

To analyze the color distribution of an image, a histogram such as shown in FIG. 2 may be constructed. FIG. 2 is a histogram in accordance with various aspects of the invention. The X-axis 210 of the histogram 205 represents color values in a single color channel, while the Y-axis represents the number of pixels in the image for each color value along the X-axis 210. While the histogram shown in FIG. 2 shows counts of pixels having colors in one color channel, it will be understood that a histogram or other data structure (e.g., a three-dimensional array) including more than one color channel may be constructed to analyze color distribution in preparation for color reduction without departing from the spirit or scope of the invention.

Instead of computing a histogram that includes a separate count (e.g., represented by bar*a* in FIG. 2) for each color found in the original image, a histogram may be constructed where each count represents the count of pixels whose colors are close together. For example, in high-color images, there may be 8 bits of color per color channel of Red, Green, and Blue. Rather than constructing a histogram having $2^{24}$ counts (one for each possible color), a histogram having $2^{15}$ counts may be constructed, and pixels having colors close to each other may be mapped to a single count. For example, in one color channel, the histogram may have $2^5$ (=32) ranges of color values. A pixel with a color between 1 and 8 inclusive may map to the first count of the histogram, while a pixel with a color in the color channel between 9 and 16 inclusive may map to the second count of the histogram, and so on. This approach of mapping multiple colors to a single count may provide a good tradeoff of speed and memory vs. quality. It will be recognized that a histogram may have more or fewer counts and colors mapped thereto and be extended to more than one color channel without departing from the spirit or scope of the invention.

After a histogram is constructed, it may then be analyzed. If there are enough colors in a palette of the device to display each color in the image, color reduction may not be necessary. Even if color reduction is not necessary, however, mapping of the colors of the image to a palette of the device may still be performed. For example, a palette may be pre-selected or selected based on other images currently displayed and a color in the image may not be included in the palette. In this case, a mapping between the colors of the image and the palette may be performed.

If there are not enough colors available in a palette to display each color of the original image, a mapping for each color of the original image to a palette color is created. Such a mapping may be created by splitting the histogram into different buckets (or groups) based on the total number of colors in the original image and combining the buckets that have less common colors that are relatively close together until the number of buckets is less than or equal to the number of colors in the palette. The process of grouping buckets of colors together in color reduction is well understood by those in the art.

Determining which pixels should map to which colors in a histogram is sometimes referred to as choosing the optimal palette for the image. As techniques for choosing the optimal palette based on a histogram of colors are also well known, such techniques will not be described in further detail here.

After the buckets have been created, a representative color of each bucket may be chosen to represent all the colors in the bucket. The representative color of a bucket of colors may be calculated as known by those skilled in the art and may involve "center-of-gravity" type calculations. The representative colors of the buckets may be used in selecting a palette.

Figure 3:
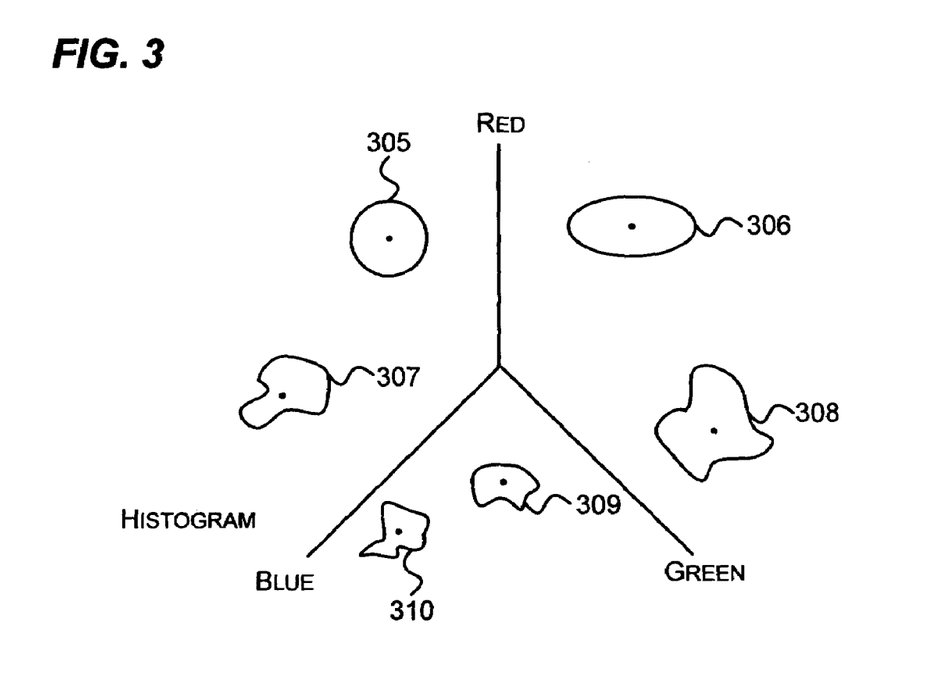
FIG. 3 is a diagram representing a histogram in a 3D color cube in accordance with various aspects of the invention.

FIG. 3 is a diagram representing a histogram in a 3D color cube in accordance with various aspects of the invention. Each of the shapes 305-310 may comprise several values that represent how many pixels in an image have a color corresponding to the values. Furthermore, each of the shapes 305-310 may include values for each color channel. In other words, although the shapes as shown in FIG. 3 may appear two-dimensional, in practice, they may have as many dimensions as there are color channels (e.g., in this case 3). In one embodiment of the invention, the shapes 305-310 may be represented by a data structure such as a three dimensional array wherein the value at each element of the three dimensional array indicates a count of pixels for colors having color channel values corresponding to the indices of the array.

A color may be chosen for each shape to represent all colors in the image that are in the shape. For example, if a device has a displayable palette having only 6 colors, the colors corresponding to the points within each of the shapes 305-310 shown in FIG. 3 may be selected to which to represent any pixels with colors falling within the shapes 305-310.

Figure 4:
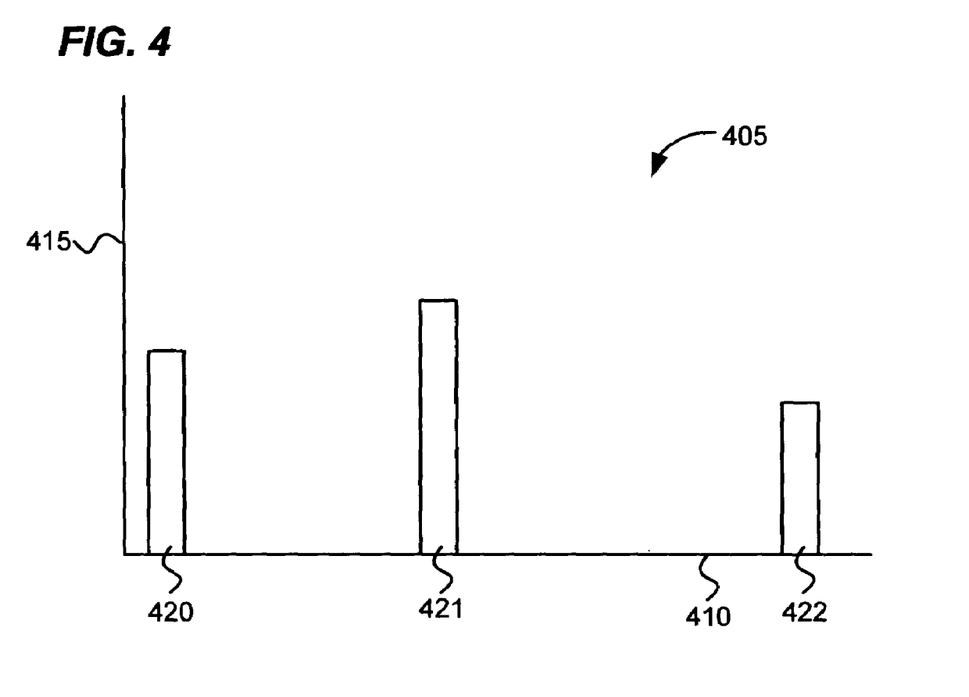
FIG. 4 is a histogram of an exemplary image in accordance with various aspects of the invention.

FIG. 4 is a histogram of an exemplary image in accordance with various aspects of the invention. The X-axis 410 of the histogram 405 represents ranges of color values in a single color channel, while the Y-axis represents the number of pixels in the image for each range along the X-axis 410. Each count may encompass a range of color values in the image. For example, the count 420 may represent how many pixels in the image have a color with a value between 1 and 8 inclusive, the count 421 may represent how many pixels in the image have a color with a value between 49 and 56 inclusive, and the count 422 may represent how many pixels in the image have a color with a value between 81 and 88 inclusive. Many other counts (not shown) may be included in the histogram and the histogram may be extended to include more than one color channel.

The following example illustrates how an artifact may occur when error correcting techniques are used. Error correcting techniques may be used, for example, to keep the overall intensity of an image the same as it would have been had the image been displayed with all of its colors. Assume that an image includes a gradient of colors with 30 consecutive pixels having a color value of 8, 30 consecutive pixels having a color value of 7, and so on to 30 consecutive pixels having a color value of 1. Also assume that the image includes other colors not in the gradient (e.g., to account for the other counts). Let the color chosen to represent the range of colors associated with count 420 have a color value of 4, and let the color chosen to represent the range of colors associated with count 421 have a color value of 52.

When mapping the pixels in the image to a selected palette, for each pixel in the image, the closest color of the palette is found and the pixel is mapped to that color. Error between the value of the pixel and the value of the palette color to which the pixel is mapped is accumulated and added to the next pixel before mapping that pixel to a color of the palette. When the 30 consecutive pixels having a color value of 8 are mapped, an error of 4 accumulates with each mapping. Eventually, the accumulated error combined with a color of a pixel to be mapped is closer to 52 than to 4. At this point, the pixel is mapped to the color value of 52, the error is reduced by the difference between 52 and the pixel color together with the accumulated error, and an artifact occurs—a pixel that stands out noticeably from other pixels having the same or similar original color value.

Figure 5:
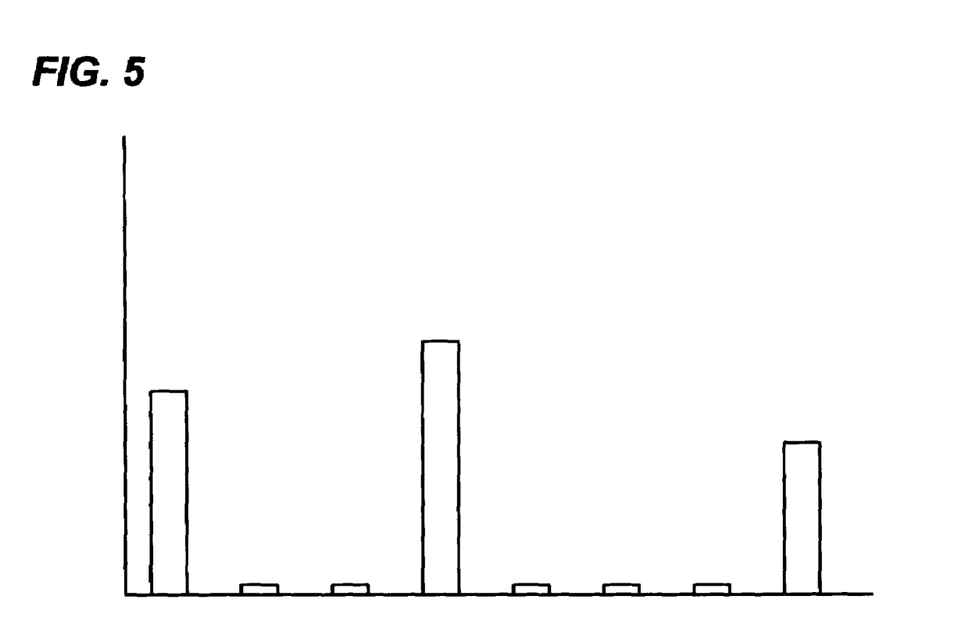
FIG. 5 is a histogram of the image indicated by the histogram of FIG. 4 with missing colors added in accordance with various aspects of the invention.

To avoid introducing these kinds of artifacts, the histogram associated with an image may be pre-seeded with additional color counts. In one embodiment of the invention, each count of the histogram is incremented so that all the colors in the color cube are represented. FIG. 5 is a histogram of the image indicated by the histogram of FIG. 4 with missing colors added in accordance with various aspects of the invention.

The histogram may have colors added before filling in the histogram with colors from the image. For example, the colors may be added by adding one to each count of the histogram before counts from the colors from the image are added. Adding one to each count of the histogram helps evenly spread the bias throughout the image. It will be recognized that adding one to each count of the histogram may not bias the overall image very much.

Alternatively, the histogram may have colors added after filling in the histogram from the colors of the image.

Values other than one may also be added to the histogram without departing from the spirit or scope of the invention. For example, a value of 0.1, 10, or some other number may be added to each count of the histogram. The counts of the histogram corresponding to colors already existing in an image may be scaled to make the bias of the added values less.

In an embodiment of the invention, colors corresponding to a half-tone or other palette may be added to the histogram. A half-tone palette may be a default palette with which to display images on a device and may be defined depending on the display characteristics of the device and the types of images that are expected to be displayed on the device. The half-tone palette is typically independent of the colors found in the image. Adding colors that correspond to a half-tone palette may bias the optimal palette selected for the image to the colors found in the half-tone palette.

In another embodiment of the invention, colors are added to the histogram according to a template. The template may indicate which counts in the histogram to add to and which counts should not be added to. This may be useful, for example, to bias a palette chosen by a color reduction algorithm to the characteristics of a particular device. For example, a device may be able to display many variations of red but may not have many variations of green.

The effect of adding additional colors allows the grouping of buckets described above to include more colors, some of which may translate into colors that are closer to the original colors of the image. When error is accumulated, this may cause a color to be selected that is much closer to the original color than the color value of the next group (e.g., the group associated with the count 421 of FIG. 4). This may reduce or eliminate the artifacts described in conjunction with FIG. 4.

Figure 6:
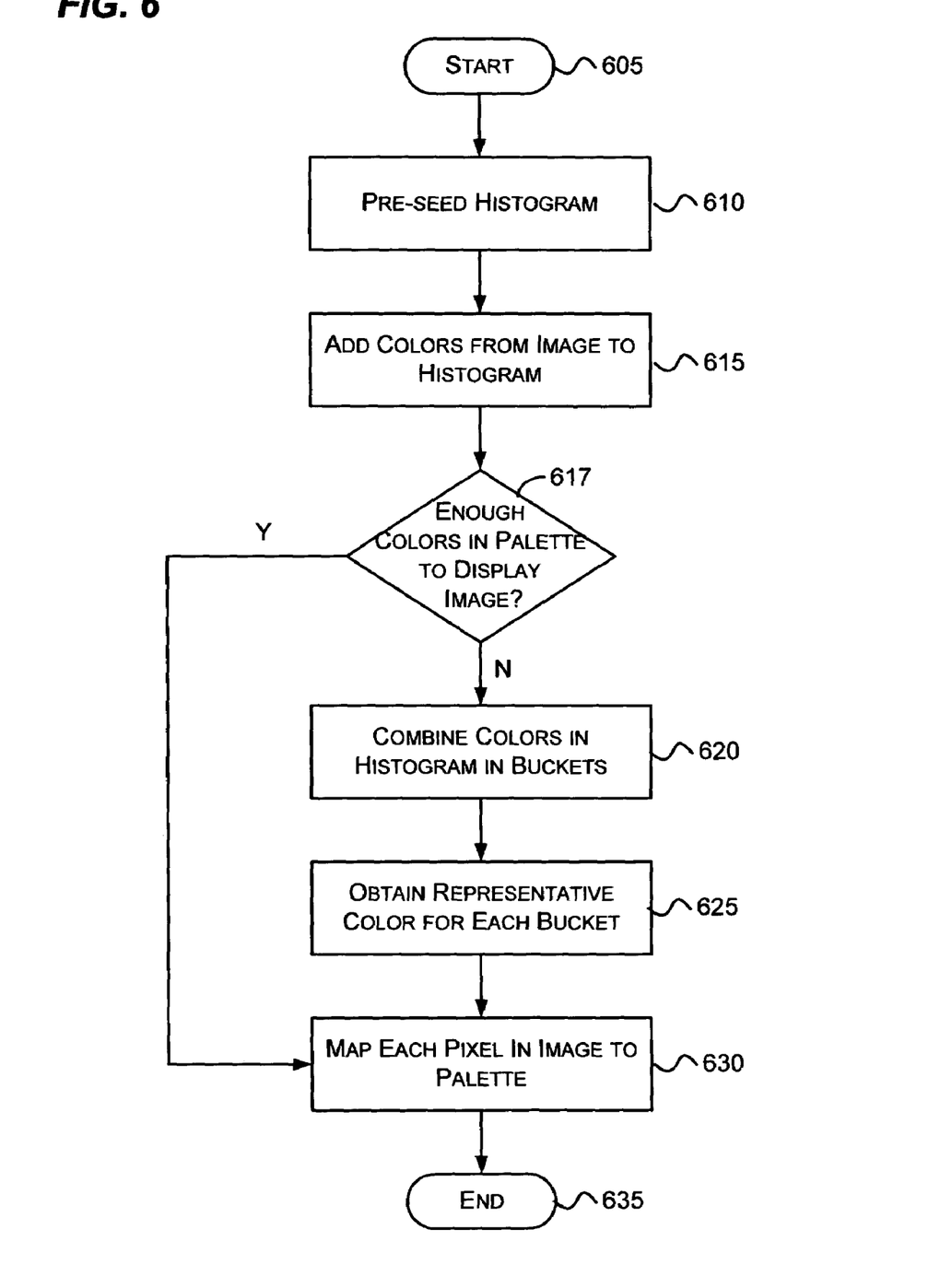
FIG. 6 is a flow diagram that generally represents exemplary actions that may occur in color reduction to reduce artifacts.

FIG. 6 is a flow diagram that generally represents exemplary actions that may occur in color reduction to reduce artifacts. At block 605, the process begins. At block 610, values are added to counts of the histogram as described previously. At block 615, counts for colors from the image are added to the histogram. Note that similar colors may be counted together as previously described. Because the bias may be added before or after the colors from the image are added to the histogram, in one embodiment of the invention, blocks 610 and 615 are reversed.

At block 617, a determination is made as to whether there are enough colors in the palette to display the image without any color reduction. If so, processing branches to block 630; otherwise, processing branches to block 620.

At block 620, colors in the histogram are combined until the number of buckets is less than or equal to the number of colors in the palette. At block 625, the representative color for each bucket is selected. A palette may be selected based on the representative colors for each pixel. Alternatively, a default or half-tone palette may be used. At block 630, each pixel in the image is mapped to the palette. This may occur by first determining the representative color for the pixel and then mapping the representative color to the closest color in the palette.

At block 635, the process ends.

Figure 7:
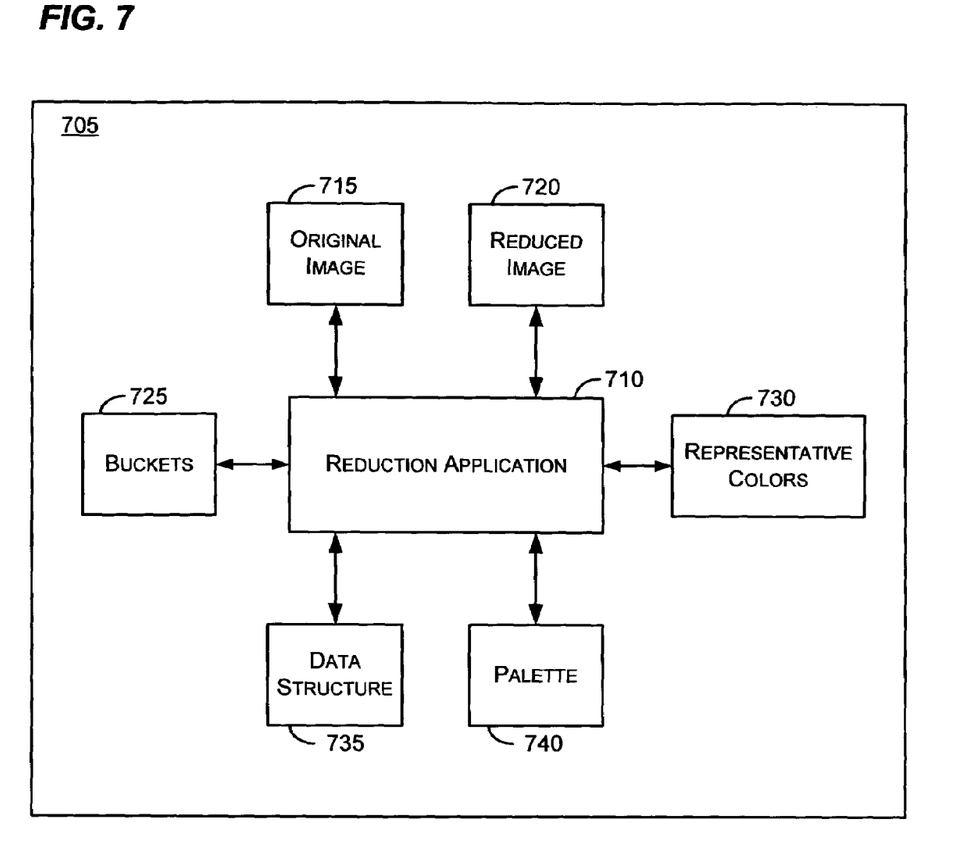
FIG. 7 is a block diagram representing an exemplary environment in which the invention may be practiced in accordance with various aspects of the invention.

FIG. 7 is a block diagram representing an exemplary environment in which the invention may be practiced in accordance with various aspects of the invention. The environment may include a computer 705 that may be implemented with some or all of the components described in conjunction with FIG. 1. A reduction application 710 may add to counts of a data structure 735 before or after counts of colors in the original image 715 are added to the data structure 735. The reduction algorithm 710 may then group the colors into buckets 725 until the number of buckets 725 are less than or equal to the number of colors available in a palette 740. For each bucket (i.e., one of buckets 725), a representative color (i.e., one of representative colors 730) is chosen. The palette 740 may be selected based on the representative colors 730 or through other techniques described above. Then the color of each pixel in the original image 715 may be mapped into a color of the palette 740 through use of the representative colors 730, the buckets 725, and the palette 740.

As can be seen from the foregoing detailed description, there is provided a method and system for reducing colors of an image. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage medium having stored computer-executable instructions, comprising:
adding a bias to a data structure, wherein the data structure is arranged to store counts of pixel colors of an image;
adding counts of pixel colors to the data structure;
grouping colors from the image via the data structure into a number of buckets until the number of buckets is less than or equal to a number of colors in a palette; and
mapping a color of a pixel in the image to a color in the palette.

2. The computer storage medium of claim 1, wherein adding a bias to a data structure comprises adding to each count of the data structure.

3. The computer storage medium of claim 2, wherein adding to each count of the data structure comprises incrementing each count of the data structure by one.

4. The computer storage medium of claim 2, wherein adding to each count of the data structure comprises changing each count of the data structure by a number other than one.

5. The computer storage medium of claim 1, wherein adding a bias to a data structure comprises adding to each count of the data structure that corresponds to a color in a selected palette.

6. The computer storage medium of claim 5, wherein the selected palette comprises a half-tone palette.

7. The computer storage medium of claim 6, wherein the half-tone palette comprises a default set of colors with which to display images on a device.

8. The computer storage medium of claim 7, further comprising mapping each pixel in the image to the half-tone palette.

9. The computer storage medium of claim 1, wherein adding a bias to a data structure comprises scaling the counts in the data structure to reduce the bias.

10. The computer storage medium of claim 1, wherein adding a bias to a data structure comprises adding to each count of the data structure as indicated by a template.

11. The computer storage medium of claim 1, wherein adding a bias to a data structure is performed before adding counts of pixel colors of the image to the data structure.

12. The computer storage medium of claim 1, wherein adding a bias to a data structure is performed after adding counts of pixel colors of the image to the data structure.

13. The computer storage medium of claim 1, wherein the data structure is represented as a histogram.

14. The computer storage medium of claim 1, further comprising computing an error associated with mapping each pixel in the image to a color in the palette.

15. The computer storage medium of claim 14, further comprising adding the error associated with one mapped pixel to a color value of another pixel before the other pixel is mapped to a color in the palette.

16. The computer storage medium of claim 1, wherein each count in the data structure indicates how many pixels in the image have a color within a range of colors and wherein each count is associated with a different range of colors.

17. An apparatus for reducing colors, comprising:
a data structure arranged to store counts of colors;
a palette arranged to store colors with which to display images; and
a reduction application arranged to perform actions, comprising:
adding counts of colors of an image to the data structure;
adding counts of other colors to the data structure;
grouping colors into buckets based on the counts in the data structure;
selecting representative colors for each bucket;
selecting the palette based on the representative colors; and
mapping colors for an original image into a reduced image based on the representative colors.

18. The apparatus of claim 17, wherein the data structure corresponds to a histogram.

19. The apparatus of claim 17, wherein the reduction application is further arranged to perform actions comprising combining buckets until the number of buckets is less than or equal to a number of colors in the palette.

* * * * *